Aug. 9, 1966

W. L. ANDERSON 3,265,151

MEANS AND TECHNIQUES USEFUL IN ESTABLISHING QUALITY OF CEMENT BONDS IN CASED BOREHOLES

Filed June 15, 1962

INVENTOR.
WARREN L. ANDERSON

BY

*Lyon & Lyon*

ATTORNEYS.

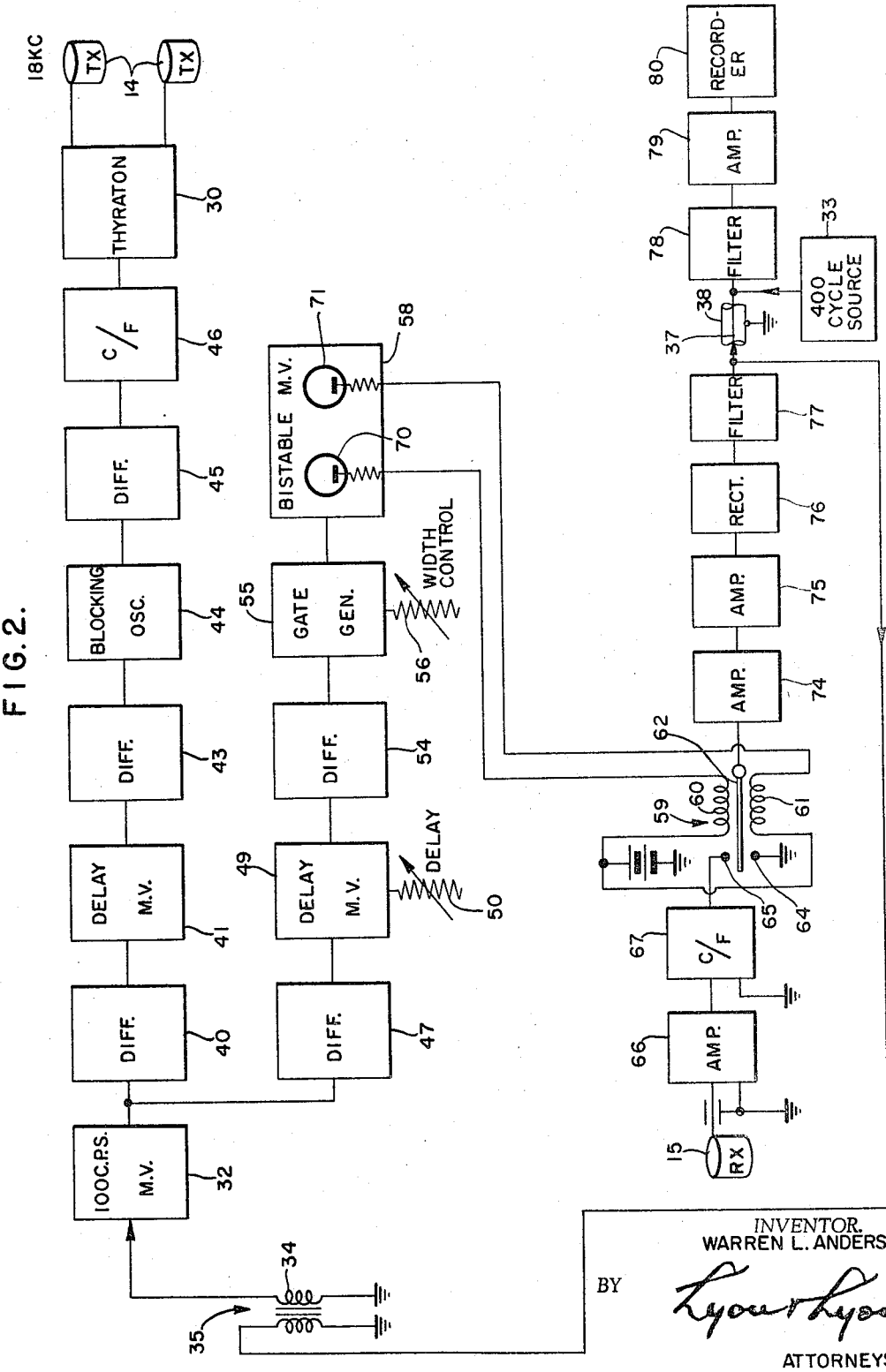

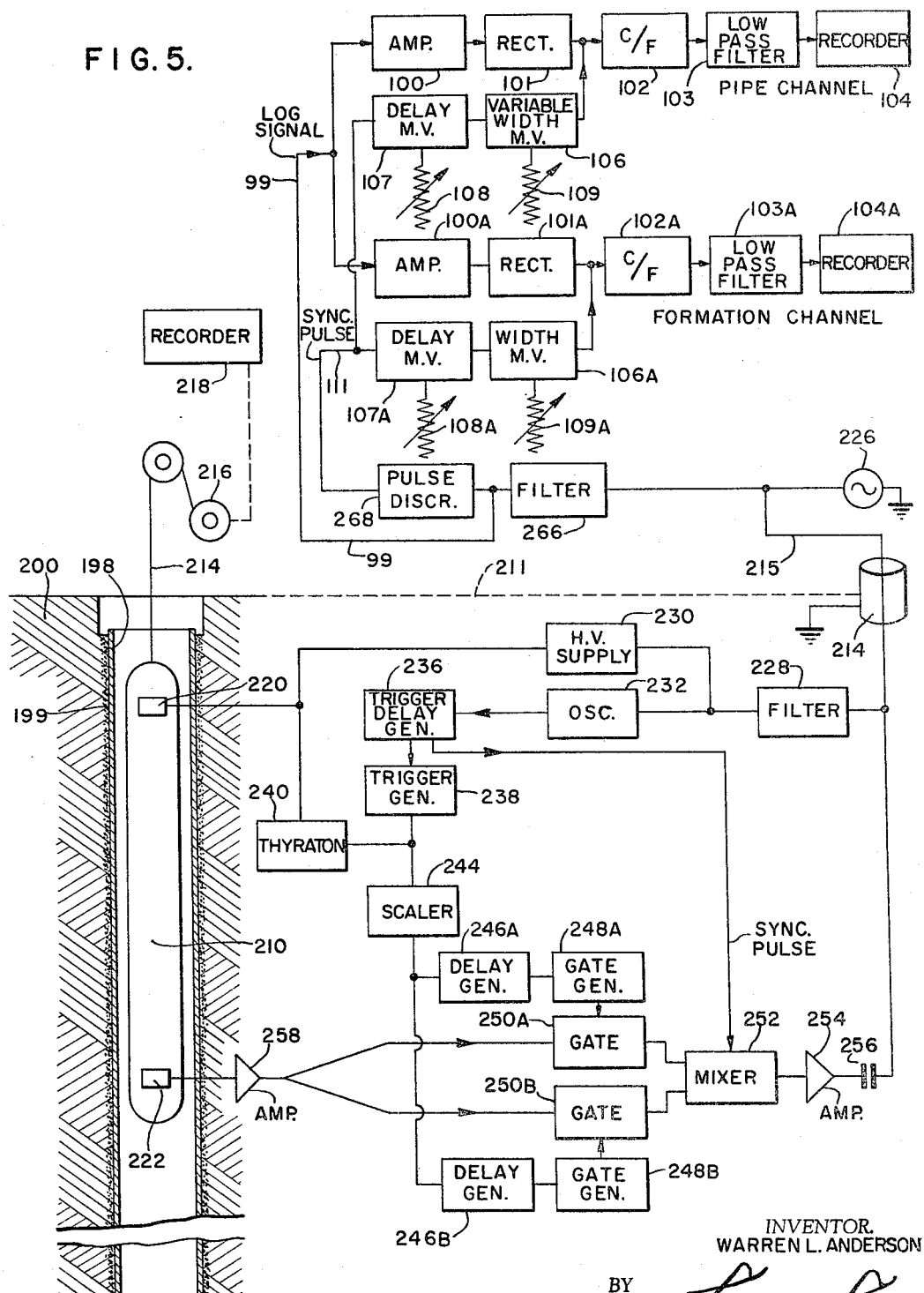

United States Patent Office 3,265,151
Patented August 9, 1966

3,265,151
MEANS AND TECHNIQUES USEFUL IN ESTABLISHING QUALITY OF CEMENT BONDS IN CASED BOREHOLES
Warren L. Anderson, Bacliff, Tex., assignor to Halliburton Company, Duncan, Okla., a corporation of Delaware
Filed June 15, 1962, Ser. No. 202,886
13 Claims. (Cl. 181—0.5)

The present invention relates to means and techniques useful in determining the quality of the bond between casing and cement, and also between the formations and the cement in a cemented cased borehole.

In general, as described herein, there is provided a logging tool that incorporates an acoustic pulse transmitter, which produces pulses at regular intervals, and receiving means for receiving the resulting acoustic energy after transmission through the casing and formations, such receiving means being suitably gated in timed relationship with transmission of such pulses in such a manner that the amplitudes of that portion of the energy pulse transmitted through the casing, on the one hand, and through the formations, on the other hand, may be compared. This comparison in amplitude of transmitted energy in the form of received signals, in accordance with important features of the present invention, allows one to determine the quality of the bond between the casing and cement and also between the formation and cement. In this respect, the present system differs from the conventional velocity logging system in that the desired information is derived in terms of amplitude.

The casing signal usually arrives at the receiver sooner than the formation signal, due to the comparative sound transmission velocities as well as due to the length of the two paths. The two signal paths, namely a first path through the casing and a second path through the formations, are chosen or selected by gating the received signal at predetermined times and the amplitudes of the received signal at correspondingly different times are compared.

It has been found that where the cement is satisfactorily bonded to the casing, the amplitude of the acoustic signal through the casing, i.e. said first path, is attenuated, and strong pipe signals occur where there is no bond or where the bond is not satisfactory. The opposite is true of the formation signal in that if the bond between the pipe and cement is satisfactory, a satisfactory cement bond to the formation permits strong signals to be received through the formation path while the additional interfaces where cement is not bonded satisfactorily to the formation will cause the amplitude of the signal transmitted through the formation to be reduced.

Using these techniques, the log produced thereby is useful for different purposes; for example, it may serve to indicate the quality of the cement job, the location of cement both as to its upper and lower limits, the effect of temperature and time, additives, hole size on the cement bond, damage to cement bond after perforation, damage or improvement of the bond after a so-called cement squeezing operation, as well as many other factors.

It is therefore an object of the present invention to provide means and techniques whereby the above-indicated results are accomplished.

Another object of the present invention is to provide an acoustic-type logging system which functions to produce indications of the amplitude of an acoustic signal transmitted through a particular path.

Another object of the present invention is to provide a new method whereby those results indicated above may be achieved.

Another object of the present invention is to provide means and techniques for locating intervening space or density discontinuity between either the casing and cement or between the cement and formation.

Another object of the present invention is to provide circuitry for accomplishing these purposes indicated above.

Another object of the present invention is to provide an arrangement of this character wherein either the pipe signal and formation signal are recorded separately in different runs of a logging tool or are recorded simultaneously in the same run of the logging tool.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

FIGURE 2 illustrates a system embodying features of the present invention.

FIGURE 5 illutrates an alternative system embodying features of the present invention.

Figure 6:
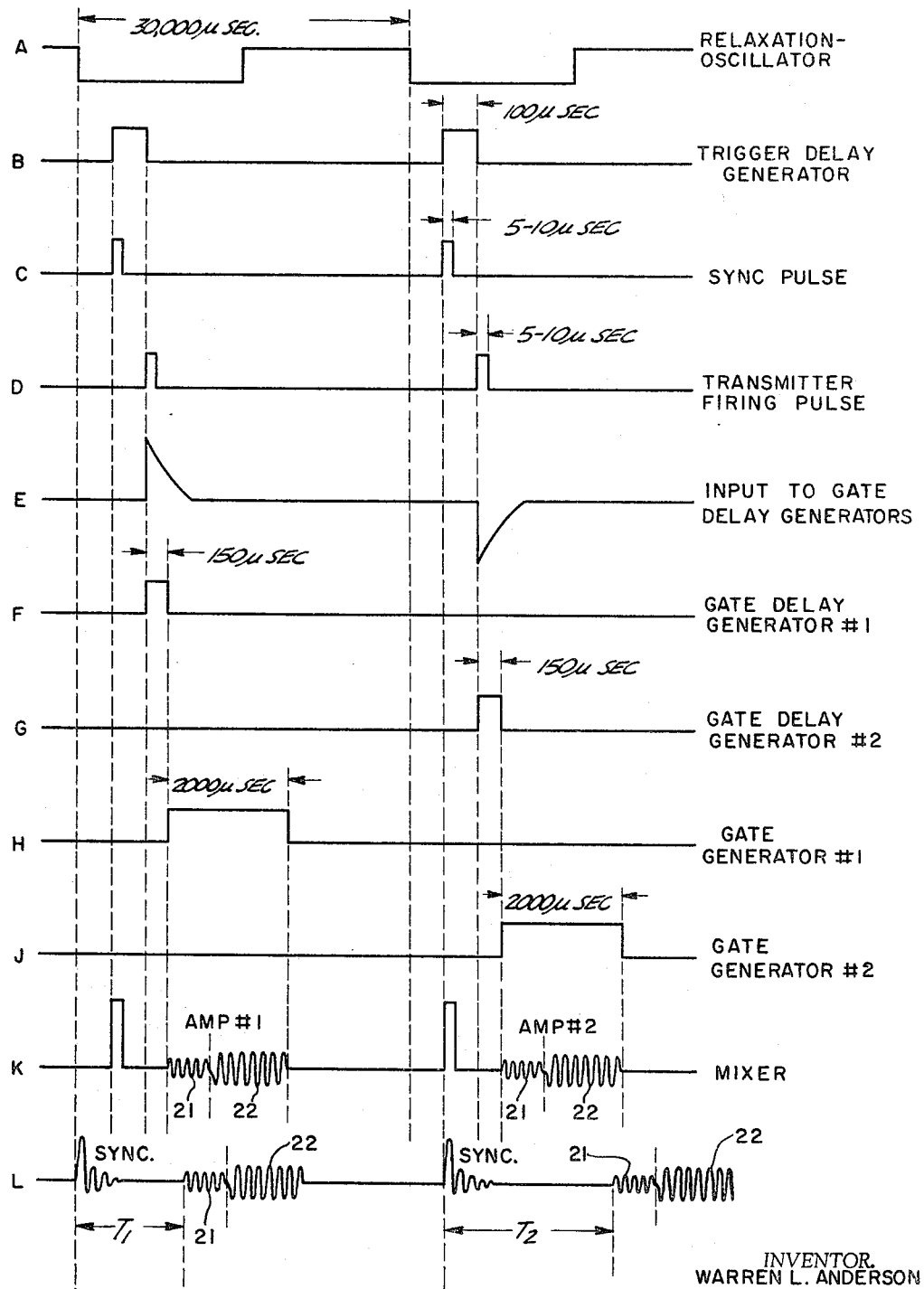

FIGURE 6 illustrates some of the waveforms in FIGURE 5.

In order to have a good bond between the well casing and the well bore wall, three conditions, in general, must be met, namely (1) the space between the casing and formation must be filled with hardened cement; (2) the cement must be bonded to the casing; and (3) the cement must be bonded to the walls of the drilled borehole. The term "bond" as used herein may be defined as coupling between the cement and pipe or formation such that there is no space intervening and no density discontinuity is present except that directly from cement to steel or directly from cement to formation.

Figure 1:
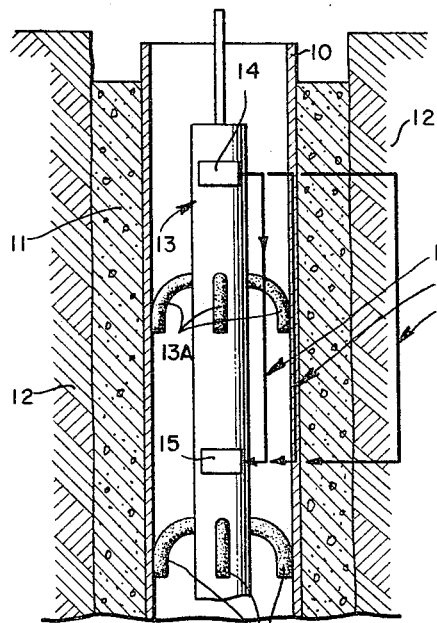
FIGURE 1 illustrates a logging tool embodying features of the present invention disposed within a cemented cased bore hole and although not to scale, illustrates generally the paths through which pulsed acoustic energy travels.

As described herein, an acoustic pulse is transmitted into the casing in the manner illustrated in FIGURE 1 wherein the steel casing is represented at 10, the cement at 11 and the formations at 12. A logging tool 13 traverses the cased hole and contains one or more transmitting crystals 14 and a receiving crystal 15, the crystals 14 and 15 being acoustically isolated within the logging tool 13 using suitable mountings and intervening structures that in effect provide a low-pass mechanical filter whereby substantially no or only a small amount of acoustic energy is transmitted directly between the transmitting crystal 14 and receiving crystal 15. Conventional means, such as rubber stand-offs 13A, may be mounted externally of the logging tool 13 for purposes of maintaining at all times the logging tool centrally within the steel casing 10 which may be filled with fluids at the time of logging.

It will be seen that FIGURE 1 illustrates generally three paths through which acoustic energy may travel, namely path 17 which extends through fluids within the casing 10, path 18 which extends parallel to and within the steel casing 10, and path 19 which extends through the formations 12.

The acoustic energy is transmitted through the steel path 18 at a velocity of approximately 17,500 feet per second corresponding to an arrival time of 57 microseconds per foot. The velocity of propagation through the path 17, i.e. through the fluids, is the slowest and may be 5,000 feet per second. The velocity of propagation through path 19 depends on the formation velocity which is normally lower than that in steel and may, for example, be 10,000 feet per second, subject, of course, to specific formation composition. The apparatus presently described serves to gate out that signal following path 17 and selectively indicates the amplitudes of the energy transmitted through paths 18 and 19.

Figure 4:
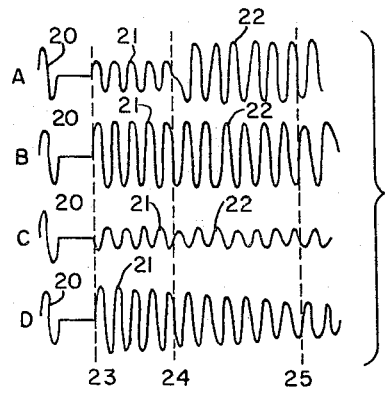
FIGURE 4 is useful in demonstrating the general nature of the acoustic signal under four different conditions.

It has been found that if the pipe 10 is not bonded, substantially no signal is received through the formation path 19 because of the large loss of energy at the pipe-mud formation interfaces. If a pipe 10 is bonded but the formation is not, the formation signal, i.e. the amplitude of the energy through path 19, will still be low, again because of the large loss of energy at the cement-mud-formation interfaces. However, if the cement is bonded to both pipe and formation, the coupling path for the formation signal is good and a high amplitude formation signal is present. This latter condition is illustrated in FIGURE 4A wherein 20 represents, on a time scale, the time of occurrence of the main transmitter pulse; the subsequent variation 21 of low amplitude indicates the pipe signal, i.e. the energy flowing through path 18; and the variation 22 represents, in general, the energy transmitted through the formation path 19. No attempt is made in FIGURE 4 to show the still later appearing signal which is transmitted through the fluid path 17. Thus, when there is a good bond, the pipe signal 21 is relatively low and the formation signal 22 is of higher amplitude as illustrated in FIGURE 4A. FIGURES 4B, 4C and 4D represent, on the same time scale, the energy received by the receiving crystal under other conditions. Thus, FIGURE 4B represents the condition where there is no cement or a poor pipe-cement bond, in which case that signal appearing between time interval 23–24 and also between time interval 24–25 are both relatively high. FIGURE 4C represents the condition wherein there is a poor cement-formation bond, in which case the signal during the time interval 23–24 is low and also that signal appearing in the time interval 24–25 is extra low. The time interval 23–24, as seen from FIGURE 4A, is the time interval within which the pipe signal may be sampled and its amplitude indicated, and the time interval 24–25 is the time interval in which the formation signal may be sampled and its amplitude indicated or measured. Another type of condition, illustrated in FIGURE 4D, is possible wherein the pipe signal is high and the actual formation signal is low but in such case such a variation as shown in FIGURE 4D would be indicative of a poor bond because the pipe signal, due to ringing of the pipe, is relatively high and extends into the formation sampling interval. While giving the appearance of a strong formation signal, its true significance is ascertained by comparison of amplitudes in the intervals 23–24 and 24–25. In general, a good bond to both pipe and formation is indicated by a relatively small casing signal followed by an average-size, but larger-size, formation signal as illustrated at FIGURE 4A.

Thus, based on my observations as described generally above in connection with FIGURE 4, I have provided new circuitry whereby the amplitude of variations during the time intervals 23–24 and 24–25 may be sampled and indicated, using a gating technique for achieving the aforesaid purposes.

Thus, as illustrated in connection with FIGURES 1 and 2, transmitting crystal or transducer 14, one or more in number, is pulsed and the amplitude of the wavetrain received through the pipe or casing 10 is measured during a particular time interval with reference to the transmitted energy pulse. The amplitude of the received signal is greatly attenuated when the pipe is not free to vibrate, as when clamped by a cement sheath. Good "clamping" action is obtained by a cement sheath thicker than one inch. Normally, formation velocities will be such that signals carried via the formations will arrive after the signal carried by the casing. The formation signal is transmitted through the pipe twice, the cement interfaces twice, and vertically through the formation.

Thus, the formation signal amplitude is affected by the attenuation at the interfaces and by attenuation in travelling through the formation. The interface attenuation is a function of cement-to-formation bond, while formation attenuation is a function of a particular formation type and varies generally exponentially with distance through the formations. A short transmitter-to-receiver spacing is desired so as to reduce the formation path attenuation, or at least reduce it so that the interface attenuation then becomes a larger portion of the recorded acoustic amplitude. The pipe signal and the formation signal are selected by a gating process. If the pipe signal amplitude is quite low, then the same is correlated in relation to the amplitude of the formation signal. A knowledge of the type of formation, obtained from prior open hole investigations, is helpful, although not necessary in all cases, in ascertaining whether the formation gated signal amplitude is normal or below normal. If below normal, then a poor cement-to-formation bond is indicated.

For these purposes, preferably the transmitter and receiver crystals are spaced apart a distance of approximately four feet.

A pulse is produced at regular intervals and applied to conventional transmitting crystals 14 which may have, for example, a nominal frequency of 18 kilocycles per second. The casing signal via path 18 arrives at the receiver crystal 15 sooner than the formation signal via path 19, due to the comparative sound transmission velocities as well as the lengths of the two paths. The gating means for the received signal constitutes the means for choosing between these two signal paths, i.e. selecting the signal paths.

Figure 3:
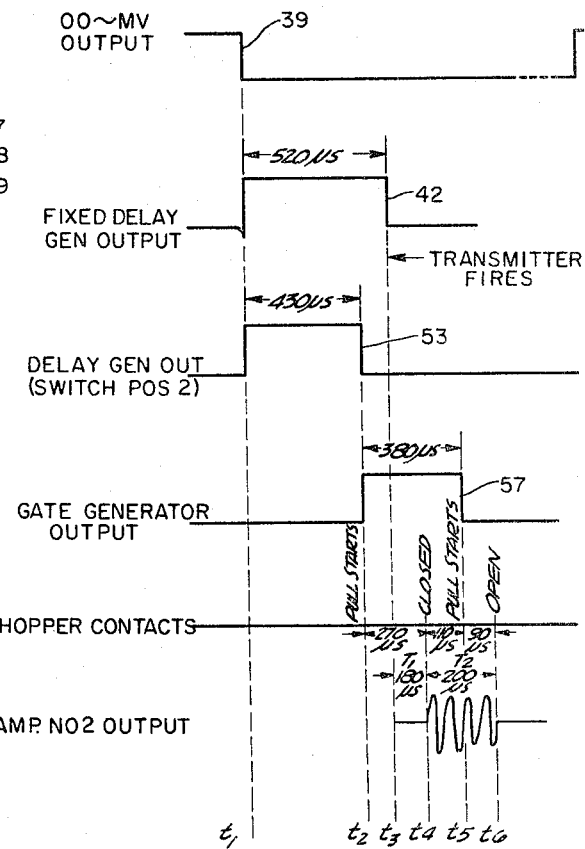
FIGURE 3 illustrates the time variation of various waveforms and signals developed in operation of the system shown in FIGURE 2.

The transmitting crystals 14 are pulsed by the thyratron 30 using the circuitry now described. A 100-cycle-per-second multivibrator 32 is synchronized at 100 cycles per second by the 400-cycle source 33 which is located on the surface and which supplies power to the tool, the synchronizing voltage being illustrated as being derived from the secondary winding 34 of transformer 35 having its primary winding connected to source 33 via the inner conductor 37 of the logging cable 38 which has its sheath grounded. The output of multivibrator 32 is illustrated at 39 in FIGURE 3, and its leading edge at time $t_1$ in FIGURE 3 is differentiated by differentiator stage 40. The negative going spikes of the differentiator output trigger the fixed delay generator or multivibrator stage 41, the same comprising a one-shot multivibrator which produces a 520-microsecond wave as illustrated at 42 in FIGURE 3. The trailing edge of this wave is differentiated in differentiator stage 43 and then applied to the blocking oscillator stage 44 which is operated by every other pulse. The output of the blocking oscillator stage 44 is differentiated by differentiator stage 45 and applied to the cathode follower stage 46 for purposes of firing the thyratron stage 30 and developing the transmitter pulse of short duration and having a frequency of approximately 18 kilocycles and a repetition rate of 50 pulses per second. It will thus be seen in FIGURE 3 that the transmitter is fired at time $t_3$ and 520 microseconds after initiation of the output wave 39.

The output of multivibrator stage 32 is applied also to the differentiator stage 47.

The delay multivibrator stage 49, which is a one-shot multivibrator, is triggered by the negative pulse developed by differentiator 47 and such stage 49 has adjustable control, as indicated at 50, for adjusting the length of the wave developed in stage 49, such wave being represented at 53 in FIGURE 3. The trailing edge of such wave 53 is differentiated by differentiator 54 and applied to the gate generator 55 having the variable width control represented at 56, the output of the gate generator 55 being represented at 57 in FIGURE 3. It will be seen that the delay control 50, as illustrated in FIGURE 3, is set so that the duration of the wave 53 is 430 microseconds and terminates at time $t_2$. The duration of the gate generator output wave 57, as adjusted by the width control 56, is illustrated as having the duration of 380 microseconds, the same beginning at time $t_2$ and terminating at time $t_5$.

The output of gate generator 55 is applied to the bistable multivibrator stage 58 which is triggered by both sides of the pulse from the gate generator 55 for operating the chopper relay 59 having coils 60, 61 and associated pivoted contact 62 which is engageable either with the grounded contact 64 or the contact 65 to which the amplified output of the receiver crystal 15 is applied. For this latter purpose, the receiver crystal 15 is coupled to the amplifier stage 66 and its output is applied through cathode follower 67 to the aforementioned contact 65.

The coils 60 and 61 are in corresponding anode circuits of tubes 70 and 71 of stage 58 so as to serve as a chopper driver. The closing pull and the opening pull on the pivoted contact 62 start building up at the instant of the beginning and end of the gate generator output pulse at corresponding times $t_2$ and $t_5$ as shown in FIGURE 3. It takes about 90 microseconds after time $t_2$ for the moving contact to leave contact 64 and another 180 microseconds for the movable contact 62 to reach the other stationary contact 65 where it arrives at time $t_4$, i.e. 270- microseconds after time $t_2$. The transmitter is fired at time $t_3$ and that portion of the received signal which is of interest has built up to full value by time $t_4$. The opening pull starts developing at time $t_5$ but the contacts remain closed another 90 microseconds, i.e. until time $t_6$. Between time $t_4$ and time $t_6$ signal is applied to the amplifier 74 having its output applied to the push-pull amplifier stage 75. The output of stage 75 is rectified in stage 76 and its output, after being filtered in filter 77, is applied via logging cable conductor 37 and filter 78 to the preamplifier stage 79 having its output applied to the recorder 80.

It will be seen that the sampling or gating interval $t_4-t_6$ is established by adjustment of controls 50 and 56 in FIGURE 2. This gating interval may, during one run of the logging tool, be adjusted to select a sample within the time interval 23–24 (FIGURE 4) and, in a succeeding run, be adjusted to achieve selection or gating or sampling within the time interval 24–25, and a comparison made between the indications or recordings produced in the two tool runs. Suitable means are provided for correlating the indications with respect to location of the tool in the well bore and such means preferably is a conventional magnetic casing collar locator that produces a recording of so-called "bench marks" or indications of the location collars in the casing 10. Such recordings as to collar locations are made in each run of the tool.

The gating of the received signal may thus be accomplished using a mechanical relay 59 as shown in FIGURE 2, or may be accomplished purely electrically without mechanical parts that have inertia as now described in connection with FIGURE 5.

In FIGURE 5, the pipe and formation signals are recorded simultaneously in the same run of the logging tool, the apparatus disclosed in the upper part of FIGURE 5 being located at the surface and incorporating dual channels, i.e. a pipe channel and a like formation channel, the elements of the formation channel being designated by the same reference numerals as corresponding elements of the pipe channel but have the letter A appended thereto. A description of the pipe channel thus suffices as a description of the formation channel.

The pipe channel includes the amplifier 100 to which the logging signal on lead 99 is applied and its output is rectified by rectifying means 101. Such output is transferred through one or more cathode follower stages 102 and low pass filter means 103 to the recorder 104 only when an enabling gate from variable-width multivibrator 106 is applied to the stage 102 to render it effective to pass said output.

This enabling gate is adjusted both as to time and duration using an adjustable delay multivibrator 107 having delay adjusting means 108 and the variable-width multivibrator 106 having adjusting means 109. The delay multivibrator is triggered by a synch pulse applied to common lead 111.

It will be understood that the system in FIGURE 5 is adjusted such that the enabling gate applied to pipe channel cathode follower 102 precedes in time that enabling gate applied to formation channel cathode follower 102A so that sampling occurs at different times, sampling of the pipe signal occurring with the time interval 23–24 (FIGURE 4) and sampling of the formation signal occuring in the time interval 24–25.

The logging signal and synch signal appearing on leads 99 and 111, respectively, may be derived from apparatus within the logging tool in a manner now described.

In FIGURE 5 the logging tool 210 traverses a cased borehole, the casing being shown at 198, the cement behind the casing at 199 and the formations at 200. The logging tool 210 is suspended from a logging cable 214. A hoisting means 216 is provided in connection with cable 214 at the earth's surface to raise and lower tool 210 as required. Connected in synchronous relation with hoist 216 is a receiver and recorder means 218. As provided, the recorder 218 is synchronized with the recorders 104 and 104A or all of the recorders shown as individual components may comprise a single recorder, i.e. a recorder in which all of the signals, as well as indication of depth from which the signals are derived, are recorded on a single recording medium.

The upper portion of tool 210 contains an electronic section shown in block diagram at the right of the tool and below the dashed line 211. Disposed below the electronic section is an acoustic transmitter 220 which is provided to convert electrical energy into acoustic energy. Transmitter 220 may be of any of several types of transducers, such as an electrostrictive, piezoelectric or magnetostrictive. A preferred embodiment of the transmitter 220 is in the form of a hollow body of electrostrictive material, for example, barium titanate or lead zirconate.

Disposed spaced-apart relation from transmitter 220 is a receiver transducer 222, the receiver being supported in spaced-apart relation by an isolation section. The isolation section is, for the general purpose mentioned above, for attenuating and/or delaying the transmission of the acoustic pulse from the transmitter through the tool until after such pulse is received at the receiver 222 through the casing 198 and surrounding earth formations through paths represented above in connection with FIGURE 1.

Alternating current power is supplied to tool 210 through a conductor 215 of cable 214 from a power supply 226. Connected to conductor 215 through a filter 228 is an oscillator 232 and a high voltage supply 230. High voltage supply 230 is connected to transmitter 220. The purpose of oscillator 232 is to provide a key frequency of, for example, 33⅓ cycles, for synchronizing the operation of the system as illustrated as the voltage A or waveform in FIGURE 6. The output of oscillator 232 is connected to a trigger delay generator 236 which has two outputs represented by voltages B and C in FIGURE 6. Voltage C, a synchronizing pulse, is connected into a mixer circuit 252. Voltage B, a delay pulse, is connected into a trigger generator circuit 238. Trigger generator 238, having an output voltage D, is connected to the control element of a thyratron 240 which periodically triggers transmitter 220.

The output of trigger generator 238 is also connected to a scaler and differentiating circuit 244. The output of circuit 244 is represented as voltage E in FIGURE 6.

Scaler 244 is connected into generators 246A, 246B which are alternatevly actuated by the respective positive and negative excursions of voltage E. The outputs of delay generators 246A and 246B are respectively illustrated as voltages F and G in FIGURE 6.

Gate generators 248A and 248B each produce voltages responsive to voltages F and G which are respectively represented by the voltages H and J. Gate generators 248A and 248B are connected into gate circuits 250A and 250B. The positive portion of voltages H and J, respectively, open the gates 250A and 250B. Gates 250A and 250B are connected into mixer 252.

Receiver 222 is connected through amplifier 258 and the amplified output is applied to each of the gate circuits 250A and 250B.

The received signal from the receiver 222, when passed by gates 250A and 240B and combined with synchronizing signals by mixer 252, produces the respective voltages at the output of mixer 252 represented by voltage K. The output of mixer 252 is connected through an amplifier 254 and a capacitor 256 to conductor 215. The synchronizing pulse of the voltake K is desirably quite large in amplitude in comparison to the signal voltage from receiver 222.

Conductor 215 is connected at the earth's surface through a filter 266 into a pulse discriminator 268, the output of filter 266 being applied to the lead 99 and the output of the pulse discriminator 268 being applied to the synch lead 111. The transmitted voltage K entering discriminator 268 from mixer 252 is degraded in character to some extent as represented by the voltage L. Discriminator 268 is of pulse height type for purposes of separating the relatively large synchronizing pulses from the following receiver signal. Thus, the logging signal is applied to lead 99 and the synch signal to lead 111 to accomplish the operation described above.

It will be appreciated that the widths and time of initiation of the gating voltages illustrated at H and J are each adjustable, adjustable means being incorporated in the delay generators 246A, 246B and gate generators 248A and 248B for purposes of controlled selection of the receiver signals 21, 22 (FIGURE 4) or portions of the same. Thus, for example, the adjustment may be made such that the gates H and J are each effective to pass the entire composite signals 21, 22 or the adjustment may be made such that gate H passes signal 21 or a portion thereof and gate J passes signal 22 or a portion thereof. In either case, the time of occurrence and width of the enabling gates applied from multivibrators 106 and 106A are corresponding adjusted such that recorder 104 produces a recording of a signal representative of the pipe or casing signal 21 and recorder 104A produces a recording of a signal representative of the formation signal 22.

It will be seen that in each case the signal through path 17, which occurs later in time, is not recorded.

The transmitting and receiving crystals are of conventional ring-shaped construction mounted coaxially within the logging tool.

As alluded to above, in some cases it is desirable or essential to know the character of the formation, particularly so when the propagation velocity therein is comparable to that in steel as, for example, in lime formations, in an interpretation of the amplitude measurements.

In general, using the system of FIGURE 5, the amplitude of the pipe signal is preferably sampled in a time interval of from 50 to 100 microseconds and, in general, the shorter the time within this range, the better, while sampling of the amplitude of the formation signal may be within a larger range.

The method and apparatus described above may be used in different manners to obtain comparisons, particularly since preferably the transmitter crystal emits a substantially constant amount of energy each time it is pulsed and the receiver crystal is preferably located a fixed distance from the transmitter crystal. Thus, by comparing measurements taken at different locations, much information is obtained as to the bonding of intermediate associated layer portions in a laminated medium which is represented in the drawings as the pipe or casing, cement and formations and particularly so when one side of such laminated medium does not lend itself to placement of a receiver crystal.

Such comparisons may be more intelligently made or facilitated when one compares measurements taken at different locations in a cased and cemented borehole with other measurements taken within a section of casing where the casing section is known to be unbonded. Such other measurements may be made either prior to placement of cement between the casing and formation and/or prior to placement of the casing with, of course, such other measurement being properly depth-correlated with respect to later measurements in the cased and cemented borehole.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

I claim:

1. In the method of determining the quality of cement bond in a cased cemented bore hole, the steps comprising transmitting an acoustic pulse inside the casing, indicating the amplitudes of the resulting acoustic energy which is transmitted through the casing and through the casing and borehole formations, and determining from the relative magnitudes of said amplitudes the quality of the bond, on the one hand, between the cement and casing and, on the other hand, the cement and the formation.

2. The method as set forth in claim 1 in which said acoustic pulse is periodically transmitted into the casing and said indications are produced at times commensurate with the times required for energy to be transmitted, on the one hand, through the casing and on the other hand, through the formations.

3. In the method for determining the quality of cement bond in a cased borehole, the steps comprising periodically developing acoustic pulses in one region within the casing and indicating at a second region in said casing the amplitude of energy transmitted through said casing and through said casing and formations at different times following each pulse of acoustic energy.

4. In the method of determining the quality of cement bond in a cased cemented borehole surrounded by formations, the steps comprising periodically transmitting an acoustic pulse within the casing at one region therein, receiving the energy resulting from said pulse at a second region within the casing, time selecting the paths through which said energy is transmitted and received through said casing and through said casing and surrounding formations, and indicating the amplitude of said energy transmitted through the selected paths.

5. In an arrangement for determining the quality of cement bond in a cased cemented borehole surrounded by formations, means within said casing periodically transmitting acoustic pulses, receiving means spaced from said transmitting means and receiving energy transmitted through said casing and through said casing and said formation resulting from said pulses, means for selecting that energy received by the receiving means at different predetermined times after transmission of said pulse, and means producing on indication of the amplitudes of the energy selected by said selecting means.

6. In an arrangement for determining the quality of cement bond in a cased borehole, means within said casing periodically transmitting an acoustic pulse, receiving means within said casing spaced from said transmitting means and receiving resulitng energy transmitted through said casing and through said casing and surrounding formations, said receiving means including indicating means for indicating the amplitude of the energy received by said receiving means, and gating means operated synchronously with said transmitting means and controlling said receiving means for rendering said indicating means operative to indicate energy at a selected time after transmission of the pulse.

7. In an arrangement for determining the quality of a cement bond in a cased borehole, means periodically transmitting an acoustic pulse, receiving means spaced from said transmitting means for receiving resulting energy that is transmitted through said casing and through said casing and said formations in response to said pulse, said receiving means including indicating means for indicating the amplitude of received energy, and switching means periodically operated in timed relationship with said transmitting means for rendering said indicating means effective only at a predetermined time after transmission of said pulse.

8. In an arrangement for determining the quality of a cement bond in a cased borehole, means periodically transmitting an acoustic pulse, receiving means spaced from said transmitting means and receiving resulting energy produced in accordance with said pulse and transmitted through the casing and through the casing and formations, said receiving means including means for selecting that energy transmitted through the casing and formations, said receiving means including indicating means for indicating the amplitude of said energy selected by said selecting means and producing an indication of the amplitude of energy transmitted, on the one hand, through said casing and on the other hand, through said formation.

9. In an arrangement for determining the quality of a cement bond in a cased borehole, means periodically transmitting an acoustic pulse within the casing, receiving means spaced from said transmitting means and receiving resulting energy transmitted by said transmitting means through said casing and formation, timed means operating synchronously with said transmitting means for selecting, on the one hand, that energy transmitted to the receiving means through the casing and, on the other hand, that energy transmitted through said formation to said receiving means, and means indicating, on the one hand, the amplitude of that energy transmitted through the casing and, on the other hand, that energy transmitted through the formation.

10. A method of detecting bonding intermediate associated layer portions in a laminated medium by means of a sound energy transmitter and a sound energy receiver spaced apart adjacent an accessible surface of said medium, comprising the steps of: generating a known amount of sound energy with said transmitter and projecting energy portions thereof inwardly of said medium near the surface portion thereof adjacent said transmitter for transmission respectively along selected ones of said layers for reception by said receiver; measuring a function of the energy received at said receiver from one of said portions and comparing this measurement with a similar measurement of another energy portion transmitted through an associated layer portion to determine the relative portions of said amount transmitted in said associated layers, said relative portions being indicative of the bonding intermediate said associated layers.

11. A method of detecting cement bond of casing in a borehole, both with respect to said casing and to the formation comprising the borehole walls, by means of apparatus comprising a sound energy transmitter adapted to generate a predetermined amount of sound energy and a sound energy receiver fixedly spaced apart within and along the axis of the borehole, comprising the steps of: locating said apparatus in a first position within a section of casing within said borehole at a point where said casing section is known to be unbonded; generating said amount of energy at said transmitter and measuring at said receiver a function of the portion of said amount transmitted over the path provided by said unbonded casing section to obtain a first measurement; relocating said apparatus in a second position within the borehole at a section where the bond condition is unknown; again generating said known amount of energy in said second position for transmission of portions thereof to said receiver along paths respectively along a segment of said casing and along a segment of formation about said borehole; taking second and third measurements in said second position of the magnitude of a function of the energy received from the portion transmitted over said casing path and of the magnitude of a function of the energy received from the portion transmitted over said formation path respectively; making a first comparison comparing said second measurement and said first measurement; and making a second comparison comparing said first measurement and said third measurement, said comparisons yielding indications of good casing bond when in said first comparison said second measurement is low with respect to said first measurement, and, provided said first indication is that the casing is bonded in the unknown section, an indication of formation bond when said third measurement approaches the value of said first measurement.

12. A method of determining total cement bond of a casing section within a borehole comprising the steps of: making an acoustical amplitude logging survey of the formation about the borehole section from within the casing; depth-correlating this log with a previously obtained amplitude log obtained from that section in the open hole prior to installation of casing; and determining the presence of or absence of amplitude variation correlation of said logs at all datums of interest within said section of said hole, the presence of amplitude variation correlation at any particular datum being indicative of the total cement bond at said particular datum.

13. A method of detecting cement bond of casing in a borehole, both in respect to said casing and to the formation comprising the borehole wall, by means of apparatus comprising a sound energy transmitter adapted to generate a predetermined amount of mechanical energy and a sound energy receiver fixedly spaced apart therefrom within and along the axis of the borehole, comprising the steps of: generating with said apparatus said amount of energy at a sequence of depth levels within the borehole prior to installation of casing and measuring and recording a series of first measurements in correlation with depth a function of the portion of said amount transmitted over the path provided by the formation comprising the walls of the uncased borehole at said levels; and subsequent to the installation of casing in said borehole, locating said apparatus in a first position within a known unbonded section of casing within said borehole; generating said amount of energy at said transmitter and making a second measurement at said receiver of a function of a portion of said amount received over the path provided by said unbonded casing section; relocating said apparatus at a sequence of depth levels within a borehole section where the casing bond condition is unknown; generating said known amount of energy at each level of said last-mentioned sequence for the transmission of portions thereof to said receiver along paths respectively including a segment of casing and said formation about said borehole; taking third and fourth measurements comprising a magnitude of a function of the energy received from the portion transmitted over said casing path and a function of the energy received from the portion transmitted over said formation path at each level of said last-mentioned sequence; correlating said third and fourth measurements by their depth sequence with the recording of said first measurement at the depth levels corresponding to the last-mentioned sequence; making a first comparison comparing said third measurement with said second measurement; and making a second comparison comparing said correlated first and fourth measurements, said first comparison yielding an indication of good cement-to-casing bond when said third measurement is low with respect to said second measurement, and, provided said indication is good, said second comparison yielding an indication of cement-to-formation bond over a range within said sequence where said fourth measurement amplitude variation correlates within said range with the amplitude variation of said first recorded measurement.

References Cited by the Examiner

UNITED STATES PATENTS

| | | | |
|---|---|---|---|
| 2,794,512 | 6/1957 | Martin | 181—.5 |
| 2,956,635 | 10/1960 | Summers | 181—.5 |
| 3,050,150 | 7/1962 | Tixier | 181—.5 X |
| 3,102,251 | 7/1963 | Blizard | 340—18 |
| 3,174,577 | 3/1965 | Holley | 181—.5 X |

BENJAMIN A. BORCHELT, *Primary Examiner.*

CHESTER L. JUSTUS, *Examiner.*

E. T. CHUNG, R. M. SKOLNIK, *Assistant Examiners.*